US010771964B2

(12) United States Patent
Sundar

(10) Patent No.: US 10,771,964 B2
(45) Date of Patent: Sep. 8, 2020

(54) SYSTEMS AND METHODS FOR PROVIDING ENCRYPTED STORAGE WITHIN APPLICATION SANDBOX

(71) Applicant: JPMorgan Chase Bank, N.A., New York, NY (US)

(72) Inventor: Gayathri Sundar, Irving, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/202,582

(22) Filed: Nov. 28, 2018

(65) Prior Publication Data
US 2020/0169875 A1   May 28, 2020

(51) Int. Cl.
| | |
|---|---|
| *H04W 12/02* | (2009.01) |
| *H04W 12/06* | (2009.01) |
| *H04W 12/04* | (2009.01) |
| *H04W 12/00* | (2009.01) |
| *G06F 21/53* | (2013.01) |
| *G06F 21/60* | (2013.01) |
| *H04L 9/14* | (2006.01) |
| *H04L 9/32* | (2006.01) |
| *H04L 9/30* | (2006.01) |
| *H04L 29/06* | (2006.01) |
| *G06F 21/78* | (2013.01) |

(52) U.S. Cl.
CPC ............ *H04W 12/02* (2013.01); *G06F 21/53* (2013.01); *G06F 21/602* (2013.01); *G06F 21/78* (2013.01); *H04L 9/14* (2013.01); *H04L 9/3066* (2013.01); *H04L 9/3271* (2013.01); *H04L 63/166* (2013.01); *H04W 12/002* (2019.01); *H04W 12/0401* (2019.01); *H04W 12/06* (2013.01); *G06F 2221/2149* (2013.01); *H04L 2209/80* (2013.01)

(58) Field of Classification Search
CPC ... H04L 9/085; H04L 9/3263; H04L 2209/80; H04L 9/0816; H04L 9/0861; H04L 9/3066; H04L 9/0866; H04L 9/0869; G06F 21/602; G06F 13/1663; G06F 21/53; G06F 21/78; H04W 12/02; H04W 12/06; H04W 12/04
See application file for complete search history.

(56) References Cited

U.S. PATENT DOCUMENTS

| | | | | |
|---|---|---|---|---|
| 2015/0188699 | A1* | 7/2015 | Sung | ............... H04L 9/0838 713/153 |
| 2015/0341178 | A1* | 11/2015 | Tanaka | ............... H04L 9/0822 713/156 |
| 2016/0359844 | A1* | 12/2016 | Saboori | ............... H04L 63/0823 |
| 2017/0244687 | A1* | 8/2017 | Moulds | ............... H04L 63/061 |
| 2018/0069699 | A1* | 3/2018 | Bowman | ............... H04L 9/006 |
| 2018/0167208 | A1* | 6/2018 | Le Saint | ............... H04L 9/0844 |
| 2019/0296911 | A1* | 9/2019 | Maki | ............... H04L 9/0894 |

* cited by examiner

*Primary Examiner* — Jaime M Holliday
(74) *Attorney, Agent, or Firm* — Greenberg Traurig LLP

(57) ABSTRACT

Systems and methods for providing encrypted storage within application sandbox are disclosed. Embodiments may secure data at rest on mobile device within application sandbox. The data may be stored in a manner that is resistant to attacks intended to reveal the data, and situations in which unintentional disclosures could occur. In embodiments, data may not be unintentionally lost, and it may be used with data that may be classified as Personally Identifiable Information.

20 Claims, 3 Drawing Sheets

SYSTEMS AND METHODS FOR PROVIDING ENCRYPTED STORAGE WITHIN APPLICATION SANDBOX

BACKGROUND OF THE INVENTION

1. Field of the Invention

The present disclosure generally relates to systems and methods for providing encrypted storage within application sandbox.

2. Description of the Related Art

Mobile devices and mobile applications often use Personally Identifiable Information, or PII, in authenticating a user. These devices and applications are targets for hacking due to their relative accessibility.

SUMMARY OF THE INVENTION

Systems and methods for providing encrypted storage within application sandbox are disclosed. According to one embodiment, in an mobile electronic device comprising at least one computer processor executing a mobile application, a method for providing encrypted storage may include: (1) establishing a valid session with a user; (2) creating or retrieving a master AES cache key (3) deriving a Device Private Key and a Device Public Key; (4) generating a Device Random Number; (5) sending the Device Random Number and the Device Public key to an authentication platform; (6) receiving, from the authentication platform, a Server Public Key, a Server Random Number, and a Server AES Key, the Server Public Key, the Server Random Number, and the Server AES Key wrapped with the Device Public Key; (7) unwrapping the Server Public Key, the Server Random Number, and the Server AES Key; (8) generating a Device AES Key based on the Server Random Number and a New Device Random Number; (9) generating a Master AES Cache Key based on the Device AES Key and the Server AES Key; and (10) encrypting data with the Master AES Cache Key and storing the encrypted data in secure storage.

In one embodiment, the Device Private Key and the Device Public Key may be an elliptic-curve cryptography key pair.

In one embodiment, the Device Random Number and the Device Public Key may be sent to the authentication platform using a transport security layer tunnel.

In one embodiment, the Server AES Key may be generated by XORing the Device Random Number with a New Server Random Number.

In one embodiment, the mobile application may generate the Device AES Key by XORing the New Device Random Number with the Server Random Number.

In one embodiment, the mobile application may generate the Master AES Cache Key by XORing the Device AES Key with the Server AES Key.

In one embodiment, the method may further include encrypting at least one of one of the Device Public Key, the Device Random Number, the Server Public Key, and the Server Random Number with a bootstrap key.

In one embodiment, encrypting data with the Master AES Cache Key and storing the encrypted data in secure storage may include splitting the Master AES Cache Key into a plurality of components; and encrypting the data successively with each of the plurality of components.

According to another embodiment, in an mobile electronic device comprising at least one computer processor executing a mobile application, a method for data decryption may include: (1) requesting a challenge from an authentication platform; (2) receiving the challenge from the authentication platform; (3) signing the challenge with a Device Private Key and communicating the signed challenge to the authentication platform; (4) receiving a Server AES Key wrapped with the Device Public Key from the authentication platform; (5) unwrapping a Device AES Key and the Server AES Key; (6) computing a Master AES Cache Key; and (7) decrypting encrypted data with the Master AES Cache Key.

In one embodiment, the Master AES Cache Key may be computed by XORing the Device AES Key with the Server AES Key.

In one embodiment, the Device Private Key and the Device Public Key may be an elliptic-curve cryptography key pair.

In one embodiment, the mobile application and the authentication platform may communicate using a transport security layer tunnel.

In one embodiment, the authentication platform may generate the Server AES Key by XORing the Device Random Number with a New Server Random Number.

According to another embodiment, a system for providing encrypted storage may include an mobile electronic device comprising at least one computer processor executing a mobile application and an authentication platform. The mobile application may a Device Private Key and a Device Public Key; may generate a Device Random Number; and may send the Device Random Number and the Device Public key to the authentication platform. The authentication platform may generate a Server Public Key, a Server Random Number, and a Server AES Key; may wrap the Server Public Key, the Server Random Number, and the Server AES Key with the Device Public Key and may send the wrapped Server Public Key, Server Random Number, and Server AES Key to the mobile application. The mobile application may unwrap the dServer Public Key, the Server Random Number, and the Server AES Key; may generate a Device AES Key using the Server Random Number and a New Device Random Number; may generate a Master AES Cache Key based on the Device AES Key and the Server AES Key; and may encrypt data with the Master AES Cache Key and stores the encrypted data in secure storage.

In one embodiment, the Device Private Key and the Device Public Key may be an elliptic-curve cryptography key pair.

In one embodiment, the authentication platform may generate the Server AES Key by XORing the Device Random Number with a New Server Random Number.

In one embodiment, the mobile application may generate the Device AES Key by XORing the New Device Random Number with the Server Random Number.

In one embodiment, the mobile application may generate the Master AES Cache Key by XORing the Device AES Key with the Server AES Key.

In one embodiment, the mobile application or the authentication platform may encrypt at least one of one of the Device Public Key, the Device Random Number, the Server Public Key, and the Server Random Number with a bootstrap key.

In one embodiment, the data may be encrypted with the Master AES Cache Key by splitting the Master AES Cache Key into a plurality of components; and encrypting the data successively with each of the plurality of components.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for providing encrypted storage within application sandbox.

Embodiments secure data at rest on mobile device within application sandbox. This may be accomplished using, for example, one or more of the following: access control with biometrics, disk-level encryption using, for example, secure Enclave for iOS and TEE for Android, etc. The data may be stored in a manner that is resistant to attacks intended to reveal the data, and situations in which unintentional disclosures could occur. In embodiments, data may not be unintentionally lost, and it may be used with data that may be classified as PII.

In embodiments, a key (e.g., MasterAESCacheKey) may comprise two components that may secure confidential and highly-confidential data (e.g., PII data)—a client component and a server component. A master key may not remain as a contiguous key in run time memory; instead, multi-party computation, or MPC, may be used.

For example, a key may be split into two parts, and the secure/highly confidential data may be first encrypted with a first part of the key, and then encrypted a second time using the second part of the key. The encrypted secure/highly confidential data may be stored in a secure cache.

In one embodiment, the key may be split into any number of suitable parts, and the secure/highly confidential data may be encrypted multiple times with the key parts.

Figure 1:
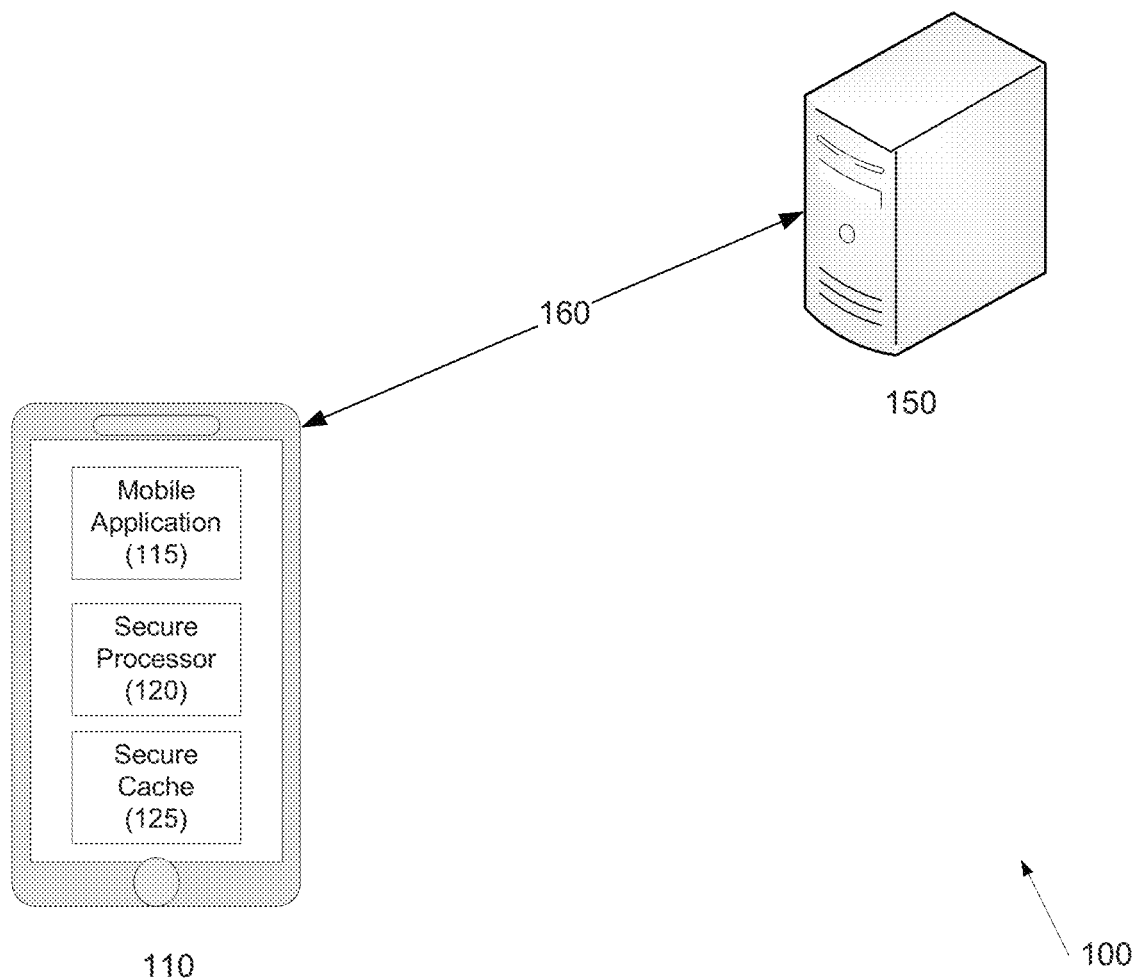
FIG. 1 depicts a system for providing encrypted storage within application sandbox according to one embodiment.

Referring to FIG. 1, a system for providing encrypted storage within application sandbox is disclosed according to one embodiment. System 100 may include mobile device 110 and server 150. Mobile device 110 may execute one or more programs or applications, such as mobile application 115. In one embodiment, mobile application 115 may receive, process, or store confidential data, such as PII data, in secure cache 125.

Mobile device 110 may further include secure processor 120, such as Secure Enclave in iOS devices, and a Trusted Execution Environment (TEE) in Android devices.

Server 150 may be any server that may manage authentication on behalf of an entity. Any suitable server 150 may be used as is necessary and/or desired.

In one embodiment, mobile application 115 and server 150 may communicate over network 160, which may provide a transport security layer (TLS) tunnel.

Figure 2:
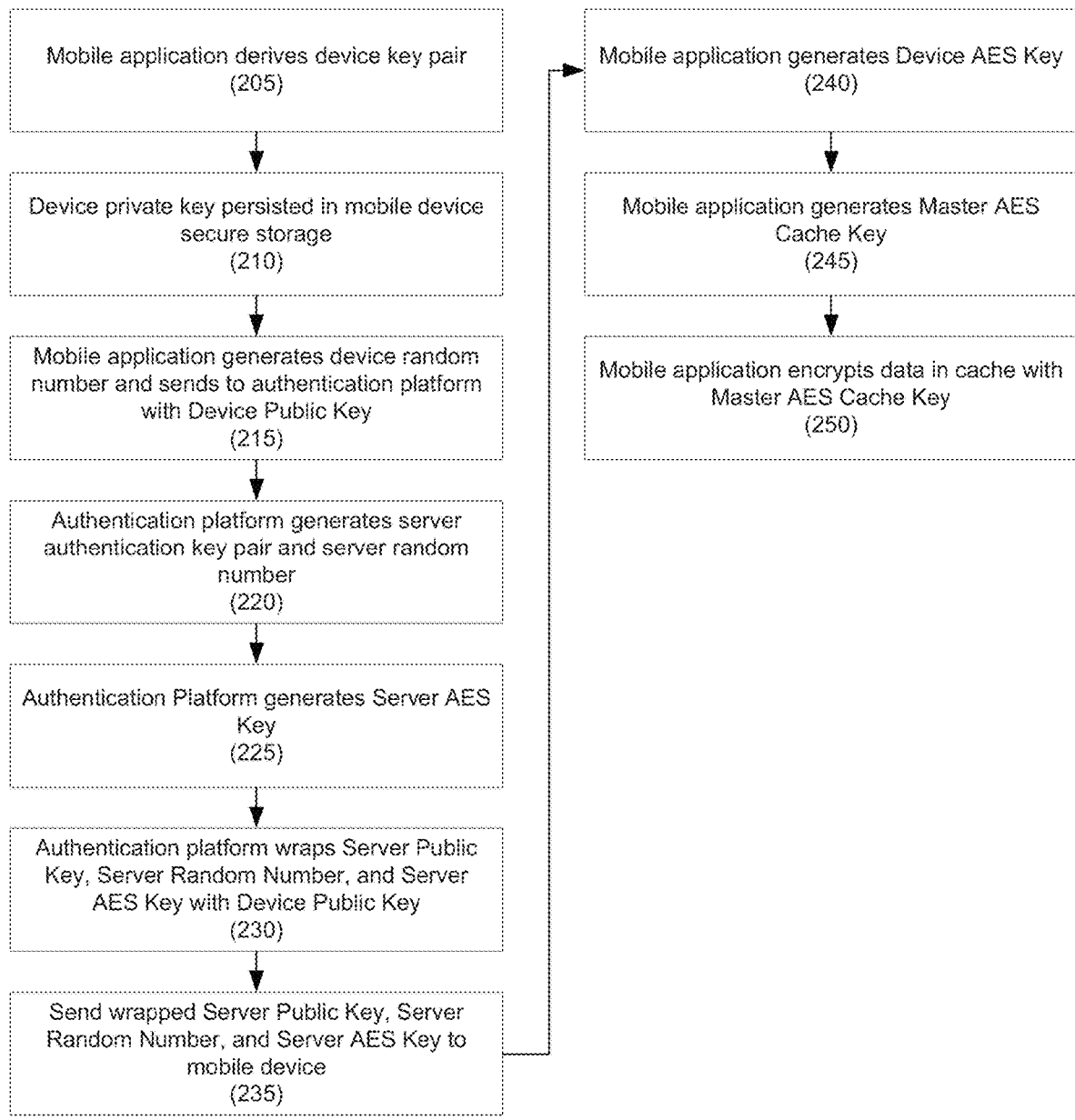
FIG. 2 depicts a method for establishing keys to provide encrypted storage within application sandbox according to one embodiment.

Referring to FIG. 2, a method for establishing keys to provide encrypted storage within application sandbox is disclosed according to one embodiment.

In one embodiment, a user may log in to a mobile application with, for example, the user may log in in any suitable fashion using a suitable authentication credential (e.g., User name/Password, TouchID, FaceID, etc.). In one embodiment, Siteminder level 7.0 authentication may be used. Other authentication methods and techniques may be used as is necessary and/or desired.

Once a valid session is established, if not already created, a master key (e.g., Master AES Cache Key) may be created.

In step 205, a mobile application may derive a key pair (e.g., an Elliptic-curve cryptography, or ECC, key pair) using, for example, the Secure Enclave or similar. For example, Device Private Key and Device Public Key may be derived.

In step 210, the Device Private Key may be persisted in the device using, for example, the Secure Enclave.

In step 215, the mobile application may generate a random number (e.g., 32 bytes) and may send the random number (e.g., Device Random Number) with the Device Public Key to an authentication platform. In one embodiment, the Device Random Number and Device Public Key may be sent via a transport security layer (TLS) tunnel.

In one embodiment, the connection to the authentication platform may be pinned.

In step 220, upon receiving the Device Random Number and the Device Public Key, the authentication platform may generate an authentication key pair for each device using, for example, ECC, as well as a random number (e.g., 32 bytes). For example, Server Public Key and Server Private Key, and Server Random Number may be generated.

In step 225, the authentication platform may generate an AES Key (e.g., ServerAESKey). In one embodiment, this be by XORing the Device Random Number with a new random number, New Server Random Number.

In step 230, the authentication platform may wrap the Server Public Key, the Server Random Number, and the Server AES Key with the Device Public Key, and, in step 235, may send the wrapped Server Public Key, the Server Random Number, and the Server AES Key to the mobile device.

In step 240, The mobile application may unwrap the Server Public Key, Server Random Number and Serer AES Key and may generate a Device AES Key. In one embodiment, Device AES Key may be generated by XORing a new device random number (e.g., New Device Random Number) with the Server Random Number.

In step 245, the mobile application may generate the Master AES Cache Key by XORing the Device AES Key with the Server AES Key.

In step 250, the mobile application may encrypt data with the Master AES Cache Key, and may store the data in, for example, secure storage.

In one embodiment, an additional key (e.g., a "bootstrap key") may be used to encrypt the Device Public Key, the Device Random Number, the Server Public Key, and the Server Random Number. This may be used in addition to certificate pinning and TLS tunnel transport.

The following table provides an exemplary summary of the keys and parameters:

| Parameter Name | What it is used for | Where it may be persisted |
| --- | --- | --- |
| Device Public Key | Encrypting the Device AES Key<br>Used by authentication platform to encrypt over the air traffic heading to the device | Application sandbox<br>Secure Enclave on device |
| Device Private Key | Decrypt DeviceAESKey | Secure Enclave on device |
| Device AES Key | Part 1 of key used to generate Master AES Cache Key | Wrapped with Device Public Key and persisted in device keychain |
| Device Random Number | Random number (e.g., 32 bytes) sent to the server<br>Prevents replay attacks and adds entropy to server AES key | Not persisted |
| New Device Random Number | Random number (e.g., 32 bytes) used to generate Device AES key | Not persisted |
| Server Public Key | Encrypting the Server AES Key<br>Used by device to send data over the air encrypted by this key for the authentication platform to decrypt. | AUTH services |
| Server Private Key | Decrypt the ServerAESKey<br>Decrypt over the air traffic from the device | AUTH services |
| Server Random Number | Random number (e.g., 32 bytes) sent to the client<br>Prevents replay attacks and adds entropy to server AES key | Not persisted |
| New Server Random Number | Random number (e.g., 32 bytes) used to generate Server AES key | Not persisted |
| Server AES Key | Part 2 of key used to generate Master AES Cache Key | Wrapped with Server Public Key and persisted within AUTH database |
| Master AES Cache Key | Master AES Cache Key = Server AES Key XOR Device AES Key | Not persisted. |

Advantages provided by embodiments include some or all of the following. If certificate pinning checks are bypassed, the bootstrapped key may be rendered useless as that data protection can be mocked by an hacker. The mobile application does not have to work offline, thus, there may not be persisting of the encrypted master key on the mobile device. The cache may be of little, if any, use without server interaction. If device is reported lost, the ServerAESKey may be invalidated. If a device fails a challenge verification, the device may flagged for monitoring.

Figure 3:
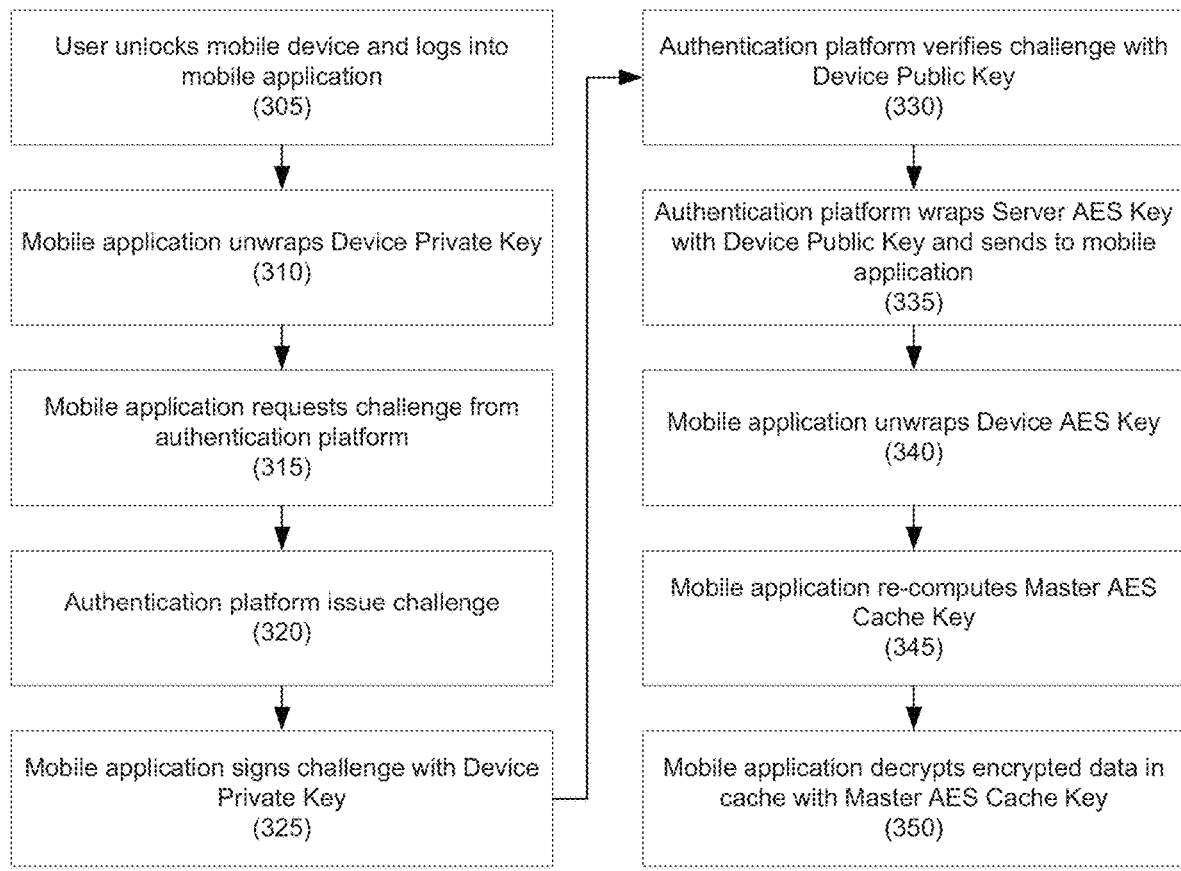
FIG. 3 depicts a method for cache decryption post-mobile application login according to one embodiment.

Referring to FIG. 3, a method for cache decryption post-mobile application login is disclosed according to one embodiment. In embodiments, the secure cache, protected by the Master AES Cache Key, may not be available until the user successfully logs in to the application, and has established a valid authentication session.

In step 305, the user may unlock the mobile device if necessary, and may log in to the mobile application. In step 310, the mobile application may unwrap the Device Private Key using, for example, the Secure Enclave.

In step 315, the mobile application may request a challenge from the authentication platform, and in step 320, the authentication platform may issue a challenge to the mobile application that needs to be signed with the Device Private Key.

In step 325, the mobile application may sign the challenge with the Device Private Key, and in step 330, the authentication platform may verify the challenge using the Device Public Key.

After successful verification, in step 335, the authentication platform may wrap the Server AES Key with Device Public Key and may send the wrapped Server AES Key to the mobile application.

In step 340, the mobile application may unwrap the Device AES Key using the Secure Enclave and, and the Server AES Key may also be unwrapped by the Secure Enclave.

In step 345, the mobile application may compute, or re-compute, the Master AES Cache Key by XORing the Device AES Key with the Server AES Key.

In step 350, the mobile application may decrypt data in, for example, secure storage, with the Master AES Cache Key.

It should be noted that the order of steps in FIGS. 2 and 3 is exemplary only and the order may change as is necessary and/or desired. In addition, it should be recognized that the embodiments disclosed herein are not exclusive to each other and aspects of one embodiment may be applied to others as is necessary and/or desired.

Hereinafter, general aspects of implementation of the systems and methods of the invention will be described.

The system of the invention or portions of the system of the invention may be in the form of a "processing machine,"

such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing encrypted storage, comprising:
   in a mobile electronic device comprising at least one computer processor executing a mobile application:
   establishing a valid session with a user;
   deriving a Device Private Key and a Device Public Key;
   generating a Device Random Number;
   sending the Device Random Number and the Device Public key to an authentication platform;
   receiving, from the authentication platform, a Server Public Key, a Server Random Number, and a Server AES (Advanced Encryption Standard) Key, the Server Public Key, the Server Random Number, and the Server AES Key wrapped with the Device Public Key;
   unwrapping the Server Public Key, the Server Random Number, and the Server AES Key;
   generating a Device AES Key based on the Server Random Number and a New Device Random Number;
   generating a Master AES Cache Key based on the Device AES Key and the Server AES Key; and
   encrypting data with the Master AES Cache Key and storing the encrypted data in secure storage.

2. The method of claim 1, wherein the Device Private Key and the Device Public Key are an elliptic-curve cryptography key pair.

3. The method of claim 1, wherein the Device Random Number and the Device Public Key are sent to the authentication platform using a transport security layer tunnel.

4. The method of claim 1, wherein the Server AES Key is generated by XORing the Device Random Number with a New Server Random Number.

5. The method of claim 1, wherein the mobile application generates the Device AES Key by XORing the New Device Random Number with the Server Random Number.

6. The method of claim 1, wherein the mobile application generates the Master AES Cache Key by XORing the Device AES Key with the Server AES Key.

7. The method of claim 1, further comprising:
   encrypting at least one of one of the Device Public Key, the Device Random Number, the Server Public Key, and the Server Random Number with a bootstrap key.

8. The method of claim 1, wherein the step of encrypting data with the Master AES Cache Key and storing the encrypted data in secure storage comprises:

splitting the Master AES Cache Key into a plurality of components; and encrypting the data successively with each of the plurality of components.

9. A method for data decryption, comprising:
in a mobile electronic device comprising at least one computer processor executing a mobile application:
requesting a challenge from an authentication platform;
receiving the challenge from the authentication platform;
signing the challenge with a Device Private Key and communicating the signed challenge to the authentication platform;
receiving a Server AES (Advanced Encryption Standard) Key wrapped with the Device Public Key from the authentication platform;
unwrapping a Device AES Key and the Server AES Key;
computing a Master AES Cache Key based on the Device AES Key and the Server AES Key; and
decrypting encrypted data with the Master AES Cache Key.

10. The method of claim 9, wherein the Master AES Cache Key is computed by XORing the Device AES Key with the Server AES Key.

11. The method of claim 9, wherein the Device Private Key and the Device Public Key are an elliptic-curve cryptography key pair.

12. The method of claim 9, wherein the mobile application and the authentication platform communicate using a transport security layer tunnel.

13. The method of claim 9, wherein the authentication platform generates the Server AES Key by XORing the Device Random Number with a New Server Random Number.

14. A system for providing encrypted storage, comprising:
a mobile electronic device comprising at least one computer processor executing a mobile application; and
an authentication platform;
wherein:
the mobile application derives a Device Private Key and a Device Public Key;
the mobile application generates a Device Random Number;
the mobile application sends the Device Random Number and the Device Public key to the authentication platform;
the authentication platform generates a Server Public Key, a Server Random Number, and a Server AES (Advanced Encryption Standard) Key;
the authentication platform wraps the Server Public Key, the Server Random Number, and the Server AES Key with the Device Public Key and sends the wrapped Server Public Key, Server Random Number, and Server AES Key to the mobile application;
the mobile application unwraps the Server Public Key, the Server Random Number, and the Server AES Key;
the mobile application generates a Device AES Key using the Server Random Number and a New Device Random Number;
the mobile application generates a Master AES Cache Key based on the Device AES Key and the Server AES Key; and
the mobile application encrypts data with the Master AES Cache Key and stores the encrypted data in secure storage.

15. The system of claim 14, wherein the Device Private Key and the Device Public Key are an elliptic-curve cryptography key pair.

16. The system of claim 14, wherein the authentication platform generates the Server AES Key by XORing the Device Random Number with a New Server Random Number.

17. The system of claim 14, wherein the mobile application generates the Device AES Key by XORing the New Device Random Number with the Server Random Number.

18. The system of claim 14, wherein the mobile application generates the Master AES Cache Key by XORing the Device AES Key with the Server AES Key.

19. The system of claim 14, further comprising:
wherein the mobile application or the authentication platform encrypts at least one of one of the Device Public Key, the Device Random Number, the Server Public Key, and the Server Random Number with a bootstrap key.

20. The system of claim 14, wherein the data is encrypted with the Master AES Cache Key by splitting the Master AES Cache Key into a plurality of components; and encrypting the data successively with each of the plurality of components.

* * * * *